United States Patent [19]

Woodilla

[11] 4,248,044
[45] Feb. 3, 1981

[54] APPARATUS FOR WAVE POWER GENERATION UTILIZING LARGE MASS DYNAMIC ENERGY ABSORPTION

[76] Inventor: Marvin F. Woodilla, 163 Albert St., Torrington, Conn. 06790

[21] Appl. No.: 906,009

[22] Filed: May 15, 1978

[51] Int. Cl.³ .............................................. F03B 13/12
[52] U.S. Cl. ..................................... 60/398; 60/497; 417/331
[58] Field of Search .................................. 60/495–507, 60/398; 417/330, 331, 337; 290/42, 53

[56] References Cited

U.S. PATENT DOCUMENTS

| 644,093 | 2/1900 | Place | 417/331 |
|---|---|---|---|
| 3,487,228 | 12/1969 | Kriegel | 60/497 X |
| 3,970,415 | 7/1976 | Widecrantz | 290/53 X |
| 4,076,463 | 2/1978 | Welczer | 417/331 |

*Primary Examiner*—Allen M. Ostrager
*Attorney, Agent, or Firm*—E. Seward Stevens

[57] ABSTRACT

This invention relates to a tuneable spring/mass dynamic energy absorber with air pumps connected so that the floats become essentially stationary while energy is absorbed at a high rate. The system has a large mass ratio (water mass/float mass) and low float buoyancy rate which combine to preclude float resonances above and below the absorber frequency.

15 Claims, 7 Drawing Figures

APPARATUS FOR WAVE POWER GENERATION UTILIZING LARGE MASS DYNAMIC ENERGY ABSORPTION

OBJECTS

The object of this machine is to convert ocean wave energy into useful electrical energy. It consists of a number of peripheral air pump pods located around a central air turbine and generator. It uses both air and water as key elements in a spring/mass dynamic energy absorber which may be "tuned" to resonate with nature's own wave frequencies.

The invention involves the recognition that a contained body of water, when under water, weighs less than an empty container out of water since weight equals gravitational force minus buoyant force and since the weight of water under water is zero. However, it has a mass equivalent to the sum of the mass of the container plus the mass of the contained water. It is mass, not weight, that determines the amount of energy in a moving spring/mass system. The amount of mass that can be used in this way is sufficient to sink the floats if placed directly on board. Previous spring/mass systems use an on board mass and are of low output energy. Large mass on board systems are not practical since a very large spring is required to support the large weight is in the order of twenty times the inertia forces. The use of a contained subsurface water mass clearly has a tremendous advantage in this respect.

The use of the air or gas as a spring allows the float structure to absorb the large fluctuating loads without load concentrations that would require complex supports and avoids possible overload and fatigue problems inherent in regular mechanical springs. The spring rate may be easily changed for various sea conditions by controlling the air/gas volume used. The spring/mass system is "tuned" by changing the spring volume with valves.

Energy is removed from the spring/mass system by an air pump which has a piston in common with the air spring piston, again eliminating complexities. The pumped air is drawn through a turbine which drives a generator directly. With this arrangement, the air intake is situated where it is high and dry.

A ribbed diaphragm connects the piston to the float and spreads the fluctuating loads over a larger area. This results in smaller pressure variations in the air spring which permits lighter weight hulls on the floats. The ribbed diaphragm tends to move in a direction opposite the motion of the piston resulting in a differential displacement. This allows a smaller air spring volume necessary to get the spring rate low enough. A diaphragm also allows necessary relative angular motion between water mass and float, will take radial loading, and prevents spring overload.

The dynamics are such that the floats are essentially stationary, and the water mass motions are 180 degrees out of phase with the wave motions. As a new wave rises under a float, it is literally flattened in a manner which gently removes energy. Damping discs prevent undesirable float oscillations which may be introduced by erratic wave conditions or by mooring lines. These discs should be kept as small as possible since they will dissipate energy. With the damping discs, and with proper "tuning", the float amplitudes will approach zero. However, the waves continue pumping air in opposition to a contained and moving water mass. This is a highly desirable condition that precludes float motion constraint by the mooring. Wave pump input prevents in phase float and water mass motions. There is no need to fear wave frequencies other than the "tuned" frequency. The large mass ratio (water mass/float mass) and low float buoyancy rate (due to central water column) combine to preclude float resonances above and below the absorber frequency.

The use of peripheral pump pods allows maximum energy absorption per unit of surface area. This machine will provide high energy output at low capital expenditure. It is simple in nature and should require minimum maintenance. There are no "moving parts" underwater, or complex and heavily loaded speed changing, clutch, and reversing mechanisms.

It is desirable to operate wave power machines reasonably close to shore to cut transmission losses and cost. A segmented tore shaped water mass vessel was developed to allow operation at a minimum low tide depth. It will be easily fabricated, and joints do not require sealing. This shape is conductive to stable linear motion and viscous drag will be minimal. Air flotation is attached to minimize spring/diaphragm preload, and supporting guide vanes prevent torque on the diaphragm in a plane perpendicular to the pump rod.

The machine is loosely anchored to the ocean bottom by a single line or morred to adjacent units in string fashion. A crossarm is provided for the latter method. It will receive and absorb wave energy from any direction, regardless of the method of securing. It can move vertically with changes in the tides. A flexible support tube will prevent shock loads as the unit is inevitably tossed against its moorings by waves or winds. When very large waves are encountered in storms, the relative vertical motion between floats and water masses will be self-limiting; subsurface wave action will lift the water masses as well as the floats.

Since a large part of the unit is underwater, there is minimum wind drag to be supported by the mooring. The central power unit, consisting of turbine, generator, plenum chamber and batteries, is placed just high enough to clear the waves and is supported by a lightweight, open frame structure.

A shock absorbing restraint at the bottom of the float limits excess relative angular motion between the float and the water mass. It also allows the necessary passage of water to the pump chamber to obtain maximum pumping efficiency; this moving water column also acts as an air pump piston.

Lights with storage batteries are provided to make the machine visible at night or in foggy weather.

Referring to the accompanying drawings illustrating an apparatus embodying my invention.

FIG. 1 details most of the inner working of the apparatus and is the primary drawing from which the principal of operation can be seen.

Figure 1:
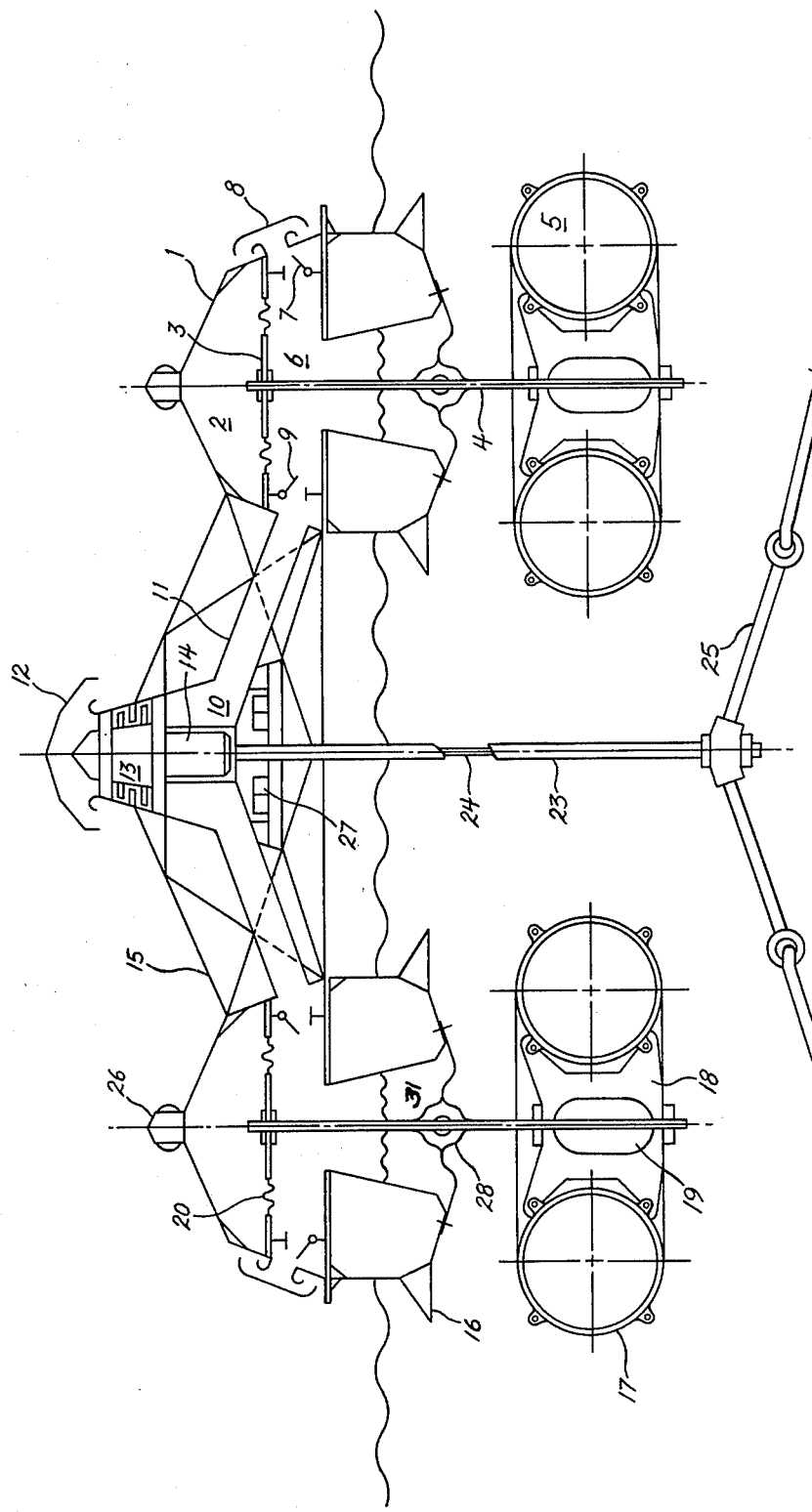
FIG. 1 is a cross section taken on the line "B—B" of FIG. 3 which is a top view.
Figure 2:
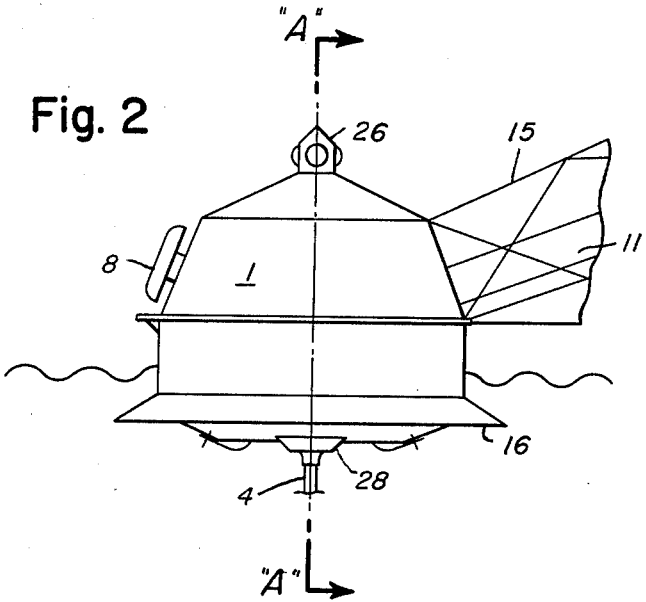
FIG. 2 is an external side view of one pod.
Figure 2A:
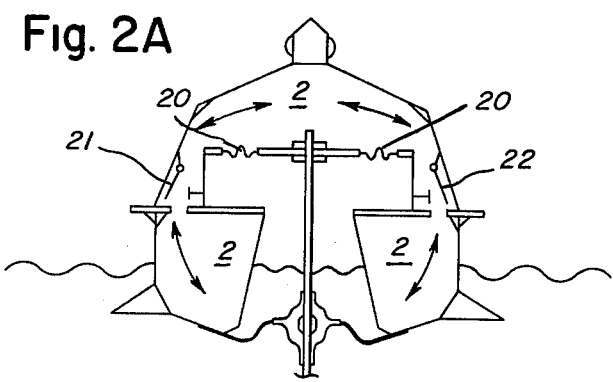

FIG. 2A details the complete air/gas spring with variable rate valves which are also inner workings, and is a section on line "A—A" of FIG. 2 looking in the direction of the arrows.

Figure 3:
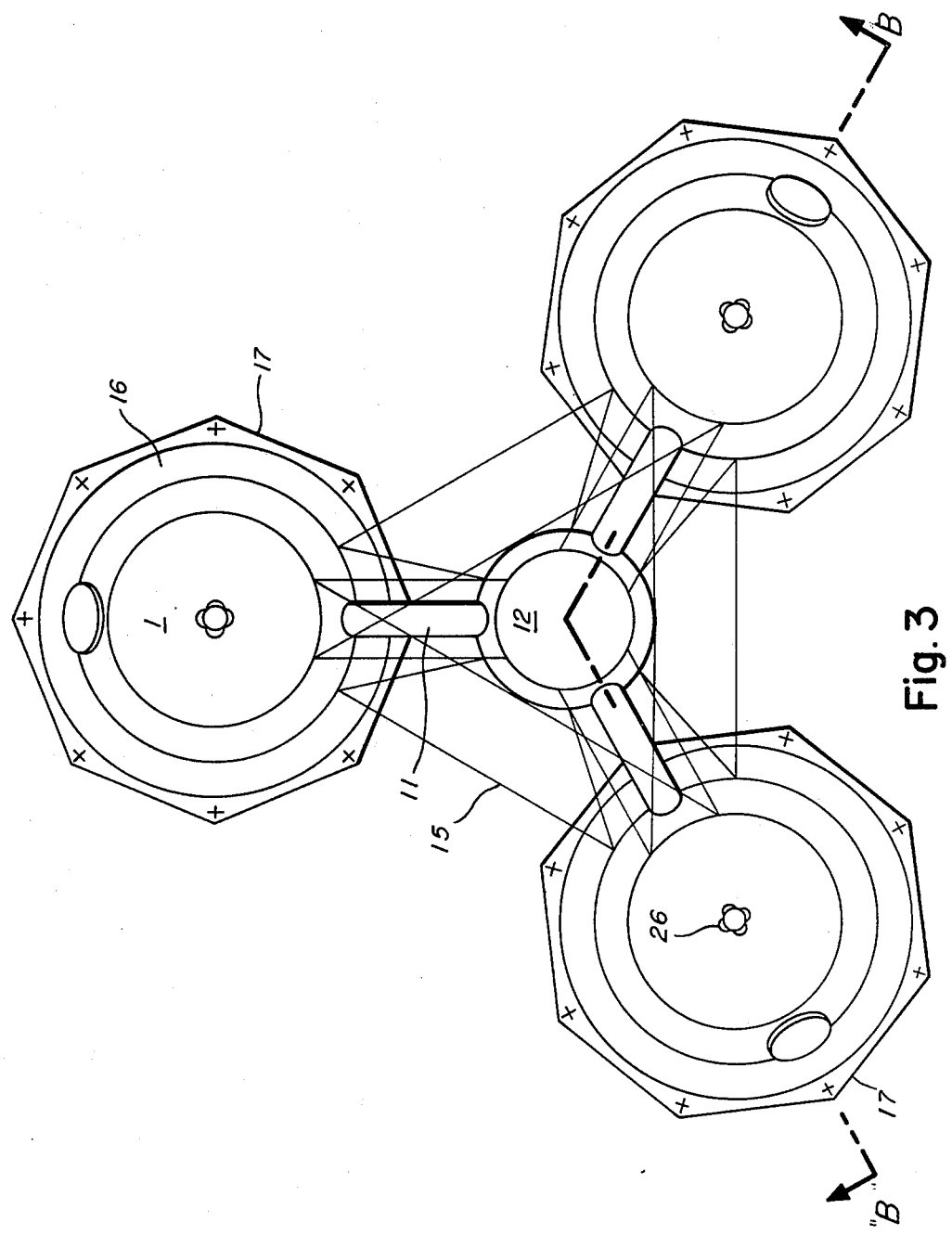

FIG. 3 is an overall external top plan view which clarifies the positioning of the peripheral pump pods around the central turbine and shows the tore shaped water mass containers which may be segmented for simple fabrication.

Figure 4:
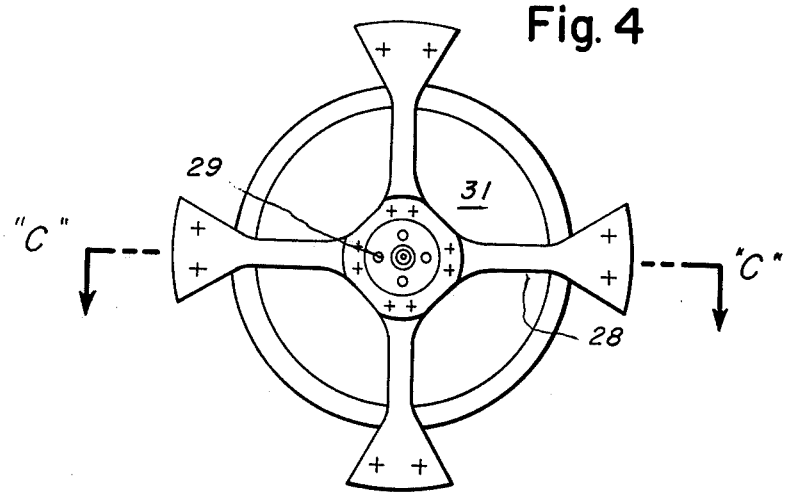

FIG. 4 is a plan view of and details the shock absorbing restraint at the bottom of the floats.

Figure 4A:
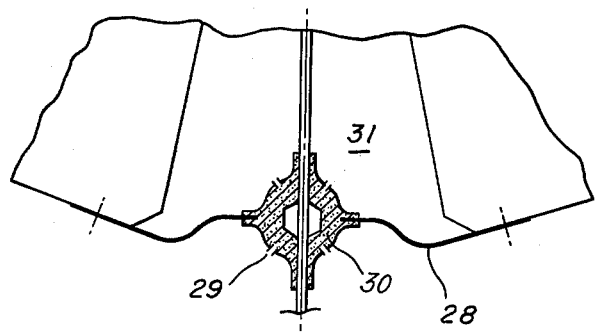

FIG. 4A represents a partial section taken on the line "C—C" of FIG. 4 looking in the direction of the arrows.

Figure 5:
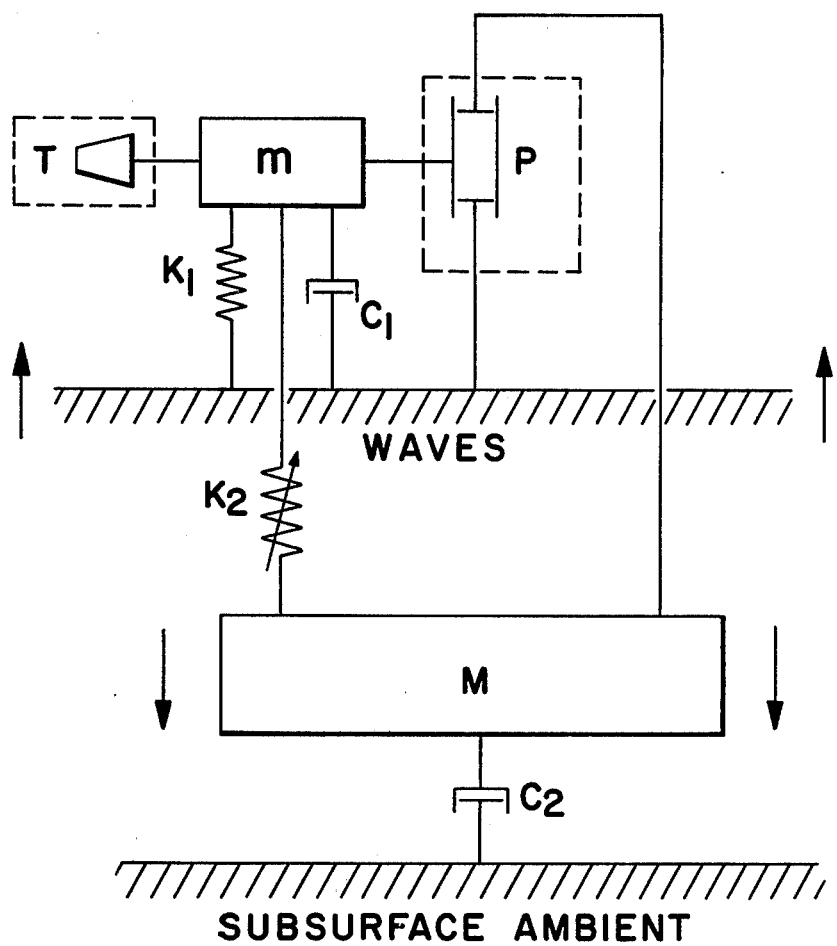

FIG. 5 is a mechanical schematic of the dynamic system which is the essence of the invention.

Referring to the accompanying drawings it is shown that this machine consists of floating air pump pods located peripherally around a central air turbine and electric generator. There are at least three pump pods.

As the first wave rises under a pump pod float 1, the float is caused to rise. This develops a vaccum condition in the air spring 2. The pump piston 3 does not immediately rise too, since it is rigidly connected, by means of pump rod 4, to a contained body of subsurface water 5, which by virtue of its large mass, has considerable inertia that resists this motion. The net effect is that air in the pump chamber 6 is put into compression, whereupon valve 7 is caused to open and exhaust air through an air outlet 8 which is covered to prevent water entry but allow air passage.

As a wave recedes from under a pump pod float 1, a process that is the reverse of the above, causes a vacuum to develop in the pump chamber 6 which then causes valve 9 to open. Air is drawn into the pump chamber 6 from a plenum chamber 10 which connects to the pump chamber 6 by means of an airflow tube 11. Depletion of air in the plenum chamber 10 causes air to be drawn into a covered air inlet 12 and then through an air turbine 13. The air turbine 13 is thereby caused to rotate at high speed and directly drives an electric generator 14 which produces useful electrical energy. The air turbine 13, generator 14, plenum 10, and batteries 27 are unitized, said unit rigidly connected to the individual pump pod floats 1 by means of a lightweight, open frame structure 15.

Damping discs 16 are mounted on the pump pod floats 1 to prevent undesirable float oscillations which may be introduced by erratic wave conditions or by mooring lines.

The water mass 5 is contained by a segmented tore shaped vessel 17. Supporting guide vanes 18 are the means of connection between vessel 17 and pump rod 4. Air flotation 19 is attached to the vanes 18 and pump rod 4.

The pump pistons 3 are connected to the floats 1 by means of a ribbed diaphragm 20. The spring rate may be changed for various sea conditions and wave frequencies by opening or closing valves 21 and 22. which may act separately or in unison.

This fine tunes the natural frequency of the air/gas spring and water mass absorber combination. Course tuning is designed into the machine by arranging the piston 3 diameter to diaphragm 20 diameter ratio and mean air/gas spring 2 volume such that the air/gas spring rate to water mass 5 ratio is low enough that this spring mass absorber combination has a natural frequency equal to the average year around wave frequency.

A flexible support tube 23 which carries the electrical cables 24 is attached to a crossarm 25 which is the means of connection to adjacent units when the machines are used in string fashion. When a single machine is used, a single loose line may serve as the mooring to the ocean bottom.

Lights 26 are mounted on top of each float 1 for night operation. Storage batteries 27 under the generator section 14 supply the steady voltage required for these lights 26 and the air spring valves 21 and 22 which may be remotely controlled.

A shock absorbing restraint 28 prevents excess relative angular motion between floats 1 and pump rods 4. Holes 29 allow water to be forced out of the restraint 28 which contains "sponge-like" material 30 so that it may act as a shock absorber.

The restraint 28 allows water passage to the pump chamber 6 so that said water column 31 may also pump air with motion in opposition to piston 3.

When the air spring 2 - water mass 5 (absorber system) is properly "tuned" to the frequency of continuous waves, the floats 1 will become essentially stationary. The motions of the waves will be 180 degrees out of phase with motions of the water masses 5. Carbon dioxide may be used in lieu of air for spring 2.

Turning to FIG. 5, a mechanical schematic of the dynamic system which is the essence of the invention. This system is based on the properties of a two spring, two mass series connection, viz: K1, m, K2, M. It is a curious and somewhat abstract property of such a dynamic system that if the waves act on K1 with a frequency equal to the natural frequency of K2 and M operating along that the K2, M system will, in effect, absorb or remove all motion (kinetic energy) from m such that m will become stationary. During such operation, the forces in K1 and K2 are always equal and M will move in 180 degree out of phase motion with the waves. One may quickly construct a simple model of this dynamic system with two cut rubber bands as K1 and K2 and two weights as m and M. These items may be all different, but if they are connected in the above mentioned series arrangement the abstraction becomes a readily observed reality. It is the use of the water itself as M and the air itself (or gas) as K2 that makes this dynamic system practical due to the long wave periods encountered in ocean waves (in the order of ten seconds). By virtue of the dynamics, we have the highly desirable condition where it is possible to absorb a large amount of energy and pump air to drive a turbine without the necessity of transmitting the pumping forces to the ocean bottom. In effect, the pumped air is caught between the waves moving one way and a contained water mass moving the other way—no need to "hang on" to the ocean bottom. Furthermore, we have a stationary float m which may be moored without constant "tugging". The cylinder to the pump P is stationary and both the waves and the water M, in effect drive two pistons in 180 degree out of phase motions to pump air through turbine T. C1 represents the damping between the float damping disc and the waves. C2 is the viscous damping of mass M by its surroundings noted as "subsurface ambient". It is important to note that this is not the ocean bottom. The ocean bottom is not part of this dynamic system. Consequently, there is no need for tide compensation devices or concern over failure of bottom connected structure in storms and this dynamic system may operate in high energy yield deep water waves.

Since it is obvious that various changes may be made in the construction, form or arrangement of the several parts without departing from the spirit and scope of my invention, I do not intend to be limited to the embodiment shown and described except as set forth in he appended claims.

What I claim is:

1. An apparatus for converting fluid wave energy into useful electrical energy comprising an electric generator,
a central air turbine connected thereto,
floating air pump pods surrounding said turbine,
a plenum chamber connecting said pods and turbine,
a pump piston moveable in each pod,
gas springs in each pod,
means for controlling the fluid gas volume of said springs adjacent said pistons,
subsurface containers of liquid and a pump rod connected to each piston and container whereby the action of the waves on the pods and subsurface containers pumps and causes air to draw through said turbine and actuate the generator.

2. An apparatus according to claim 1 in which the connection between each pod and a pump rod comprises a ribbed diaphragm.

3. An apparatus according to claim 1 in which some pump pistons are driven in opposite directions in 180° out of phase motions.

4. An apparatus according to claim 1 including at least three air pump pods surrounding said turbine and connected thereto.

5. An apparatus according to claim 1 in which the means for controlling the fluid gas volume adjacent said pistons comprises individually operable valves in each air pump pod.

6. An apparatus according to claim 1 including means for controlling relative motion between the floating air pump pods and the pump rods including a shock absorbing restraint connected with each rod.

7. An apparatus according to claim 1 including a buoyant member attached to each pump rod and submerged among and mounted on said subsurface containers.

8. An apparatus according to claim 1 including a common support for the floating air pump pods, turbine, generator, and plenum chamber.

9. An apparatus according to claim 1 including means mounted on the floating pump pods for preventing oscillations of said pods, said means comprising damping discs on said floating pump pods.

10. An apparatus according to claim 1 including means for transmitting electrical current from the generator to a desired station, said means comprising an electric cable and its flexible support tube, and a cross-arm for said tube.

11. An apparatus according to claim 1 in which the springs are mechanical only.

12. An apparatus according to claim 1 including guide vanes connecting each subsurface container to a pump rod.

13. An apparatus according to claim 1 in which each air pump including a reciprocable piston and means for driving same in 180° out of phase motion with wave action on the floating air pods and subsurface containers.

14. An apparatus according to claim 1 comprising a float mass having a mass less than that of the subsurface contained mass, a spring system attached to said masses, means for tuning said spring system and means for providing low float buoyancy rate whereby said tuning removes all motion energy from the float mass system so that the float system become essentially stationary and free of resonances at frequencies other than the tuned frequencies.

15. An apparatus for converting fluid wave energy into useful energy including floating air pump pods, subsurface containers of liquid, springs interconnected with said containers and pods, means operated by the coaction of said pods, containers and springs for transferring energy from the container and spring combination, and other means for receiving said transferred energy.

* * * * *